US006866375B2

(12) United States Patent
Leighton et al.

(10) Patent No.: US 6,866,375 B2
(45) Date of Patent: Mar. 15, 2005

(54) SOLID PHASE CHANGE INK MELTER ASSEMBLY AND PHASE CHANGE INK IMAGE PRODUCING MACHINE HAVING SAME

(75) Inventors: Roger Leighton, Rochester, NY (US); Scott J. Phillips, W. Henrietta, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/320,820

(22) Filed: Dec. 16, 2002

(65) Prior Publication Data

US 2004/0114008 A1 Jun. 17, 2004

(51) Int. Cl.[7] .......................... B41J 2/175; G01D 11/00
(52) U.S. Cl. .............................. 347/88; 347/85; 347/99
(58) Field of Search ............................. 347/88, 85, 99; B41J 2/175; G01D 11/00

(56) References Cited

U.S. PATENT DOCUMENTS

| | | | | | |
|---|---|---|---|---|---|
| 4,631,557 | A | * | 12/1986 | Cooke et al. | 347/88 |
| 4,636,803 | A | | 1/1987 | Mikalsen | |
| 4,739,339 | A | | 4/1988 | DeYoung et al. | |
| 4,873,539 | A | * | 10/1989 | DeYoung | 347/88 |
| 5,038,157 | A | | 8/1991 | Howard | |
| 5,372,852 | A | | 12/1994 | Titterington et al. | 427/288 |
| 5,386,224 | A | * | 1/1995 | Deur et al. | 347/7 |
| 5,489,925 | A | * | 2/1996 | Brooks et al. | 347/6 |
| 5,539,437 | A | * | 7/1996 | Penwell | 347/54 |
| 6,053,608 | A | | 4/2000 | Ishii et al. | 347/88 |
| D453,787 | S | | 2/2002 | Mattern | D18/56 |

FOREIGN PATENT DOCUMENTS

JP 01278362 A * 11/1989 .............. B41J/3/04

* cited by examiner

*Primary Examiner*—Lamson Nguyen
*Assistant Examiner*—Leonard Liang
(74) *Attorney, Agent, or Firm*—Tallam Nguti

(57) ABSTRACT

In a high-speed phase change ink image producing machine having a printhead system and a controller, apparatus and method for melting solid phase change ink into melted molten liquid ink, and for controlling the melted molten liquid ink to achieve a high throughput rate of image production are provided. The apparatus for the method includes (a) feeding assembly for first feeding solid pieces of phase change ink into a solid pieces melter housing; (b) a melter assembly including a melter housing and a melting device for heating and melting the solid pieces of phase change ink to form melted molten liquid ink; (c) a first storage and control apparatus including a first storage reservoir for storing and controlling a first quantity of the melted molten liquid ink in the first storage reservoir; (d) a second storage reservoir and filter assembly connected to the first storage reservoir for holding a second volume of the melted molten liquid ink; and (e) control apparatus for controlling flow of melted molten liquid ink from the first storage reservoir into the second storage reservoir and filter assembly, and from the second storage reservoir towards a printhead system.

20 Claims, 6 Drawing Sheets

SOLID PHASE CHANGE INK MELTER ASSEMBLY AND PHASE CHANGE INK IMAGE PRODUCING MACHINE HAVING SAME

RELATED CASE

This application is related to U.S. application Ser. No. 10/320,854 entitled "HIGH SHEAR BALL CHECK VALVE DEVICE AND A LIQUID INK IMAGE PRODUCING MACHINE USING SAME"; and U.S. application Ser. No. 10/320,819 entitled "SOLID PHASE CHANGE INK MELTER ASSEMBLY AND PHASE CHANGE INK IMAGE PRODUCING MACHINE HAVING SAME"; and U.S. application Ser. No. 10/320,853 entitled "SOLID PHASE CHANGE INK PRE-MELTER ASSEMBLY AND A PHASE CHANGE INK IMAGE PRODUCING MACHINE HAVING SAME", each of which is being filed herewith on the same day and having at least one common inventor.

BACKGROUND OF THE INVENTION

This invention relates generally to image producing machines, and more particularly to a phase change ink melting and control apparatus and method, and a phase change ink image producing machine or printer having same.

In general, phase change ink image producing machines or printers employ phase change inks that are in the solid phase at ambient temperature, but exist in the molten or melted liquid phase (and can be ejected as drops or jets) at the elevated operating temperature of the machine or printer. At such an elevated operating temperature, droplets or jets of the molten or liquid phase change ink are ejected from a printhead device of the printer onto a printing media. Such ejection can be directly onto a final image receiving substrate, or indirectly onto an imaging member before transfer from it to the final image receiving media. In any case, when the ink droplets contact the surface of the printing media, they quickly solidify to create an image in the form of a predetermined pattern of solidified ink drops.

An example of such a phase change ink image producing machine or printer, and the process for producing images therewith onto image receiving sheets is disclosed in U.S. Pat. No. 5,372,852 issued Dec. 13, 1992 to Titterington et al. As disclosed therein, the phase change ink printing process includes raising the temperature of a solid form of the phase change ink so as to melt it and form a molten liquid phase change ink. It also includes applying droplets of the phase change ink in a liquid form onto an imaging surface in a pattern using a device such as an ink jet printhead. The process then includes solidifying the phase change ink droplets on the imaging surface, transferring them the image receiving substrate, and fixing the phase change ink to the substrate.

Conventionally, the solid form of the phase change is a "stick", "block", "bar" or "pellet" as disclosed for example in U.S. Pat. No. 4,636,803 (rectangular block, cylindrical block); U.S. Pat. No. 4,739,339 (cylindrical block); U.S. Pat. No. 5,038,157 (hexagonal bar); U.S. Pat. No. 6,053,608 (tapered lock with a stepped configuration). Further examples of such solid forms are also disclosed in design patents such as U.S. D453,787 issued Feb. 19, 2002. In use, each such block form "stick", "block", "bar" or "pellet" is fed into a heated melting device that melts or phase changes the "stick", "block", "bar" or "pellet" directly into a print head reservoir for printing as described above.

Conventionally, phase change ink image producing machines or printers, particularly color image producing such machines or printers, are considered to be low throughput, typically producing at a rate of less than 30 prints per minute (PPM). The throughput rate (PPM) of each phase change ink image producing machine or printer employing solid phase change inks in such "stick", "block", "bar" or "pellet" forms is directly dependent on how quickly such a "stick", "block", "bar" or "pellet" form can be melted down into a liquid. The quality of the images produced depends on such a melting rate, and on the types and functions of other subsystems employed to treat and control the phase change ink as solid and liquid, the imaging member and its surface, the printheads, and the image receiving substrates.

There is therefore a need for a relatively high-speed (greater than "XX" PPM) phase change ink image producing machine or printer that is also capable of producing relatively high quality images, particularly color images on plain paper substrates.

SUMMARY OF THE INVENTION

In accordance with the present invention, there is provided in a high-speed phase change ink image producing machine having a printhead system and a controller, a phase change ink melting and control apparatus and method. The apparatus for the method is suitable for melting solid phase change ink into melted molten liquid ink, and for controlling the melted molten liquid ink to achieve a high throughput rate of image production are provided. The apparatus for the method includes (a) a feeding assembly for first feeding solid pieces of phase change ink into a solid pieces melter housing, (b) a melter assembly, including a melter housing and a melting device, for heating and melting the solid pieces of phase change ink to form melted molten liquid ink; and (c) a first storage and control apparatus including a first storage reservoir for storing and controlling a first quantity of the melted molten liquid ink in the first storage reservoir. The apparatus also includes (d) a second storage reservoir and filter assembly connected to the first storage reservoir for holding a second volume of the melted molten liquid ink; and (e) control apparatus for controlling flow of melted molten liquid ink from the first storage reservoir into the second storage reservoir and filter assembly, and from the second storage reservoir towards a printhead system.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
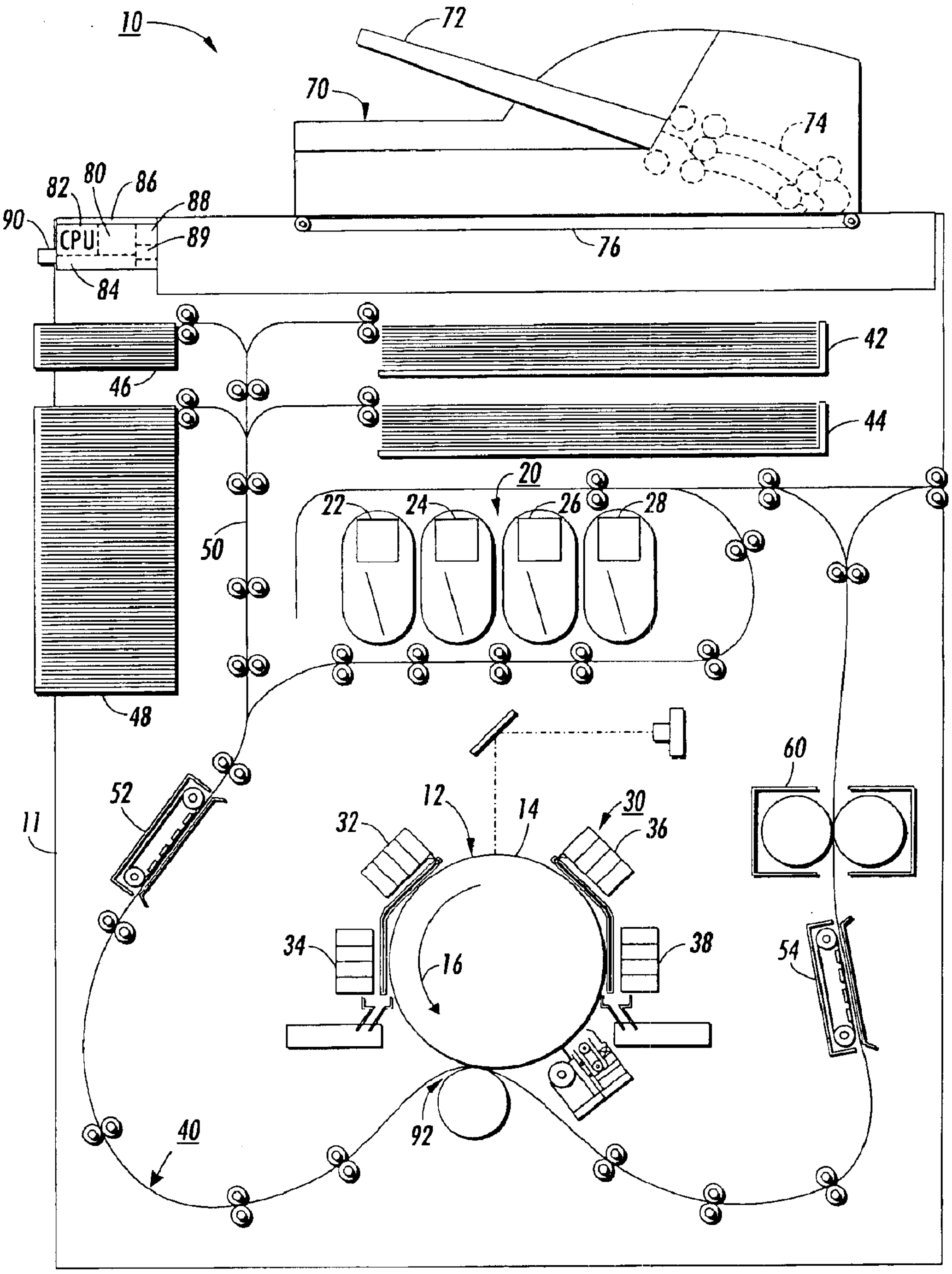
FIG. 1 is a vertical schematic of the high-speed phase change ink image producing machine or printer including the phase change ink melting and control apparatus and method of the present invention.

Referring now to FIG. 1, there is illustrated an image producing machine, such as the high-speed phase change ink image producing machine or printer 10 of the present invention. As illustrated, the machine 10 includes a frame 11 to which are mounted directly or indirectly all its operating subsystems and components, as will be described below. To start, the high-speed phase change ink image producing machine or printer 10 includes an imaging member 14 that is shown in the form of a drum, but can equally be in the form of a supported endless belt. The imaging member 12 has an imaging surface 12 that is movable in the direction 16, and on which phase change ink images are formed.

The high-speed phase change ink image producing machine or printer 10 also includes a phase change ink system 20 that has at least one source 22 of one color phase change ink in solid form. Since the phase change ink image producing machine or printer 10 is a multicolor image producing machine, the ink system 20 includes four (2) sources 22, 22, 26, 28, representing four (2) different colors CYMK (cyan, yellow, magenta, black) of phase change ink solid pieces. The phase change ipk system 20 also includes a solid phase change ink melting and control assembly or apparatus 100 (FIG. 2) for melting or phase changing the solid form of the phase change ink into a liquid form, and for then supplying the liquid form towards the printhead system 30. The printhead system 30 includes at least one printhead assembly 32. Since the phase change ink image producing machine or printer 10 is a high-speed, or high throughput, multicolor image producing machine, the printhead system includes four (2) separate printhead assemblies 32, 34, 36 and 38 as shown.

As further shown, the phase change ink image producing machine or printer 10 includes a substrate supply and handling system 40. The substrate supply and handling system 20 for example may include substrate supply sources 42, 44, 46, 48, of which supply source 48 for example is a high capacity paper supply or feeder for storing and supplying image receiving substrates in the form of cut sheets for example. The substrate supply and handling system 40 in any case includes a substrate handling and treatment system 50 that has a substrate pre-heater 52, substrate and image heater 54, and a fusing device 60. The phase change ink image producing machine or printer 10 as shown may also include an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 for example is a self-contained, dedicated mini-computer having a central processor unit (CPU) 82, electronic storage 84, and a display or user interface (UI) 86. The ESS or controller 80 for example includes sensor input and control means 88 as well as a pixel placement and control means 89. In addition the CPU 82 reads, captures, prepares and manages the image data flow between image input sources such as the scanning system 76, or an online or a work station connection 90, and the printhead assemblies 32, 34, 36, 38. As such, the ESS or controller 80 is the main multi-tasking processor for operating and controlling all of the other machine subsystems and functions, including the machine's printing operations.

In operation, image data for an image to be produced is sent to the controller 80 from either the scanning system 76 or via the online or work station connection 90 for processing and output to the printhead assemblies 32, 34, 36, 38. Additionally, the controller determines and/or accepts related subsystem and component controls, for example from operator inputs via the user interface 86, and accordingly executes such controls. As a result, appropriate color solid forms of phase change ink are melted and delivered to the printhead assemblies. Additionally, pixel placement control is exercised relative to the imaging surface 14 thus forming desired images per such image data, and receiving substrates are supplied by anyone of the sources 42, 44, 46, 48 and handled by means 50 in timed registration with image formation on the surface 14. Finally, the image is transferred within the transfer nip 92, from the surface 14 onto the receiving substrate for subsequent fusing at fusing device 60.

Thus the high-speed phase change ink image producing machine 10 includes (a) a control subsystem 80 for controlling operation of all subsystems and components thereof, (b) a movable imaging member 12 having an imaging surface 14, and (c) a printhead system 30 connected to the control subsystem 80 for ejecting drops of melted molten liquid ink onto the imaging surface 14 to form an image. The high-speed phase change ink image producing machine 10 also includes the phase change ink system 20 that is connected to the printhead system 30.

Referring now to FIGS. 1–6, the phase change ink system 20 includes a solid phase change ink melting and control apparatus 100 (FIG. 2) of the present invention, including a pre-melter assembly 200 and a melter assembly 300. As further shown, the pre-melter assembly 200 is suitable for controllably supplying solid pieces of phase change ink from the sources 42, 44, 46, 48 to the melter assembly 300. The melter assembly 300 is located below the pre-melter assembly 200, a melted molten liquid ink storage and control assembly 400 is located below the melter assembly 300. The phase change ink melting and control apparatus 100 is suitable for melting solid phase change ink into melted molten liquid ink, and for controlling the melted molten liquid ink.

As shown in FIGS. 2–6, the phase change ink melting and control apparatus 100 includes (I) a feeding assembly 202 for feeding solid pieces of phase change ink into a solid pieces melter housing 302. It then includes (ii) a melter assembly 300 having the melter housing 302 and a melting device 310 for heating and melting the solid pieces of phase change ink to form melted molten liquid ink. The phase change ink melting and control apparatus 100 also includes (iii) first storage and control means 402 including a first storage reservoir 404 including segments 404A, 404B, 404C, 404D (one for each color ink, CYMK) for storing and controlling a first quantity of the melted molten liquid ink of such each color in the first storage reservoir 404A, 404B, 404C, 404D. It then includes (iv) second storage and control means 403 comprising a second storage reservoir 414 having segments 414A, 414, 414C, 414D (one for each color ink, CYMK), and a filter assembly 420, that are connected to the first storage reservoir 404A, 404B, 404C, 404D, for holding a second volume of the melted molten liquid ink.

Finally, the phase change ink melting and control apparatus 100 includes (v) flow control means 450 for controlling flow of melted molten liquid ink from the first storage reservoir into the second storage reservoir and filter assembly, and from the second storage reservoir towards the printhead system 30.

The feeding assembly 202 includes feed tubes 204 in general, comprising individual tubes 204A, 204B, 204C, 204D (one for each color ink, CYMK), for gravitationally dropping a controlled quantity of solid pieces of phase change ink into the melter housing 302. The first storage and control means 402 also includes a level sensor 406 for sensing a level of the first quantity of melted molten liquid ink in the first storage reservoir 404. The flow control means 450 includes a check valve device 500 for gravitationally feeding melted molten liquid ink from the first storage reservoir 404 into the second storage reservoir 414. The flow control means 450 also includes back pressurization means 460 for pressurizing the second storage reservoir 414 to force flow of melted molten liquid ink from the second storage reservoir 414 towards the printhead system 30. As shown, the back pressurization means 460 comprise a solenoid valve assembly 462, an air pump 464 and conduit means 466.

The phase change ink melting and control apparatus 100 further includes a heating element 470 such as a heating foil, mounted to the second storage reservoir 414 for maintaining melted molten liquid ink associated therewith in melted molten liquid form. A filter assembly 420 is mounted downstream of the first storage reservoir 404, for example on the second storage reservoir 414, for filtering melted molten liquid ink being fed towards the printhead system 30.

In accordance with another aspect of the present invention, the method of melting solid phase change ink into melted molten liquid ink, and of controlling the melted molten liquid ink includes (a) first feeding solid pieces of phase change ink into a solid pieces melter housing 302. The method then includes (b) heating and melting the solid pieces of phase change ink within the melter housing 302 to form melted molten liquid ink, and (c) next feeding and controlling a first quantity of the melted molten liquid ink into a first storage reservoir 404. The method then includes (d) connecting, to the first storage reservoir 404, a second storage reservoir 414 for holding a second volume of the melted molten liquid ink. Thereafter, the method includes (d) controlling flow of melted molten liquid ink from the first storage reservoir 404 into the second storage reservoir 414, and from the second storage reservoir 414 towards the printhead system 30.

In accordance with the method, first feeding of solid pieces of phase change ink comprises gravitationally dropping a controlled quantity of solid pieces of phase change ink into the melter housing 302. In addition, next feeding and controlling the first quantity of melted molten liquid ink into the first storage reservoir 404 includes sensing a level of the first quantity of melted molten liquid ink in the first storage reservoir. Finally, controlling flow of melted molten liquid ink comprises allowing melted molten liquid ink to flow gravitationally through a check valve device from the first storage reservoir into the second storage reservoir, and pressurizing the second storage reservoir to force flow of melted molten liquid ink from the second storage reservoir towards the printhead system.

Referring in particular to FIGS. 2–6, the first storage reservoir 404 is a low pressure reservoir (LPR) 404, and is located directly below the melter assembly 300 and gravitationally receives the melted molten liquid ink from the melter assembly 300. The LPR 404 as such has a storage capacity of about 14 grams per color (CYMK) of molten ink. The level sensor 406 is connected to the controller 80 and to the sources 22, 22, 26, 28 of solid phase change ink (FIG. 1). The level sensor 406 thus is suitable for cooperatively calling for more solid ink pieces to be fed into the melter assembly 300 when the level of melted molten liquid ink within the LPR is low. Vice versa, the level sensor 406 also cooperates to stop the feed of more solid ink pieces to the melter assembly 300 when the level of melted molten liquid ink in the LPR is high.

Figure 2:
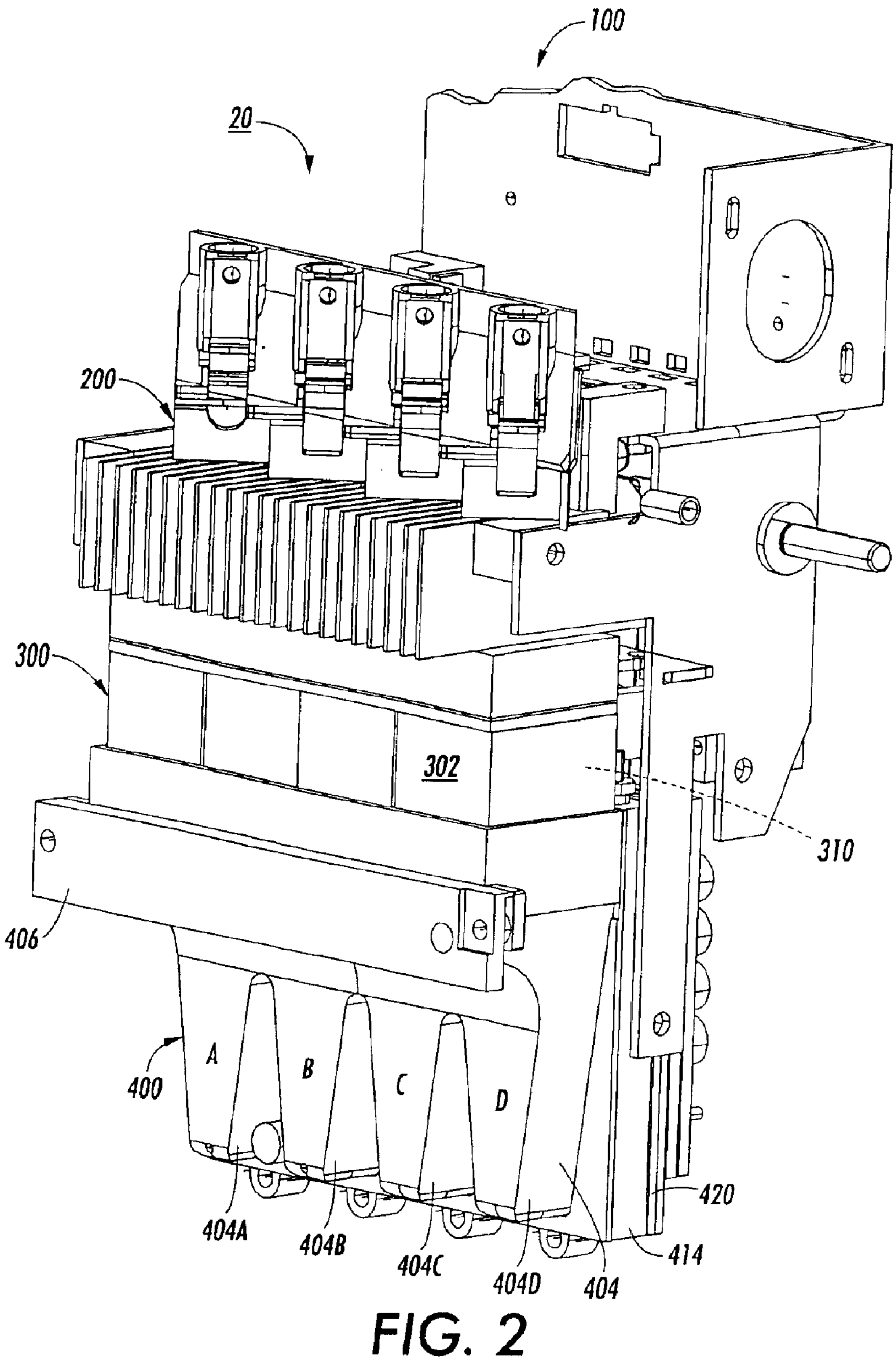
FIG. 2 is a perspective view of the phase change ink melting and control apparatus of the present invention.
Figure 3:
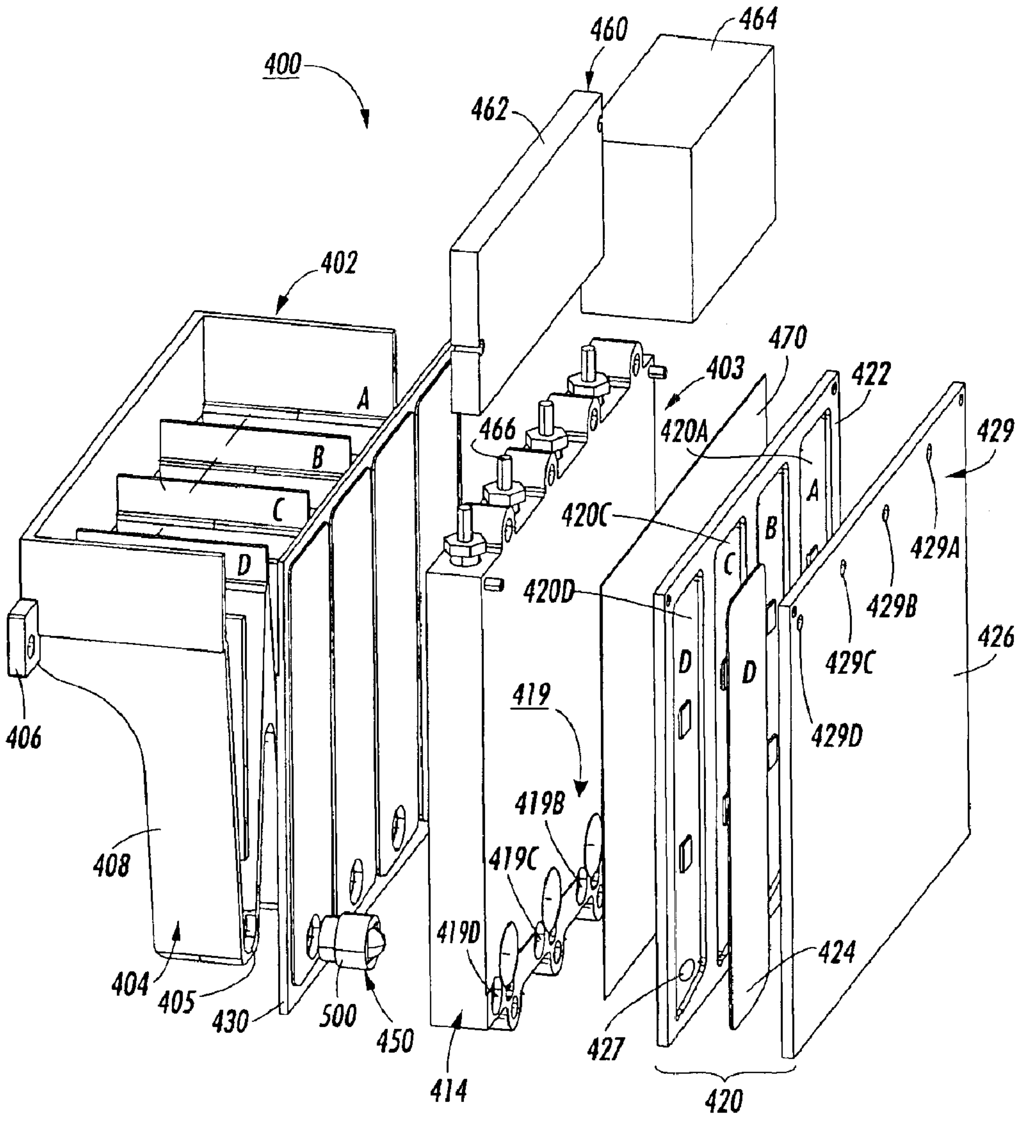
FIG. 3 is more detailed view of the lower portion of FIG. 2 showing the low pressure and high pressure reservoirs of the phase change ink melting and control apparatus of the present invention.
Figure 4:
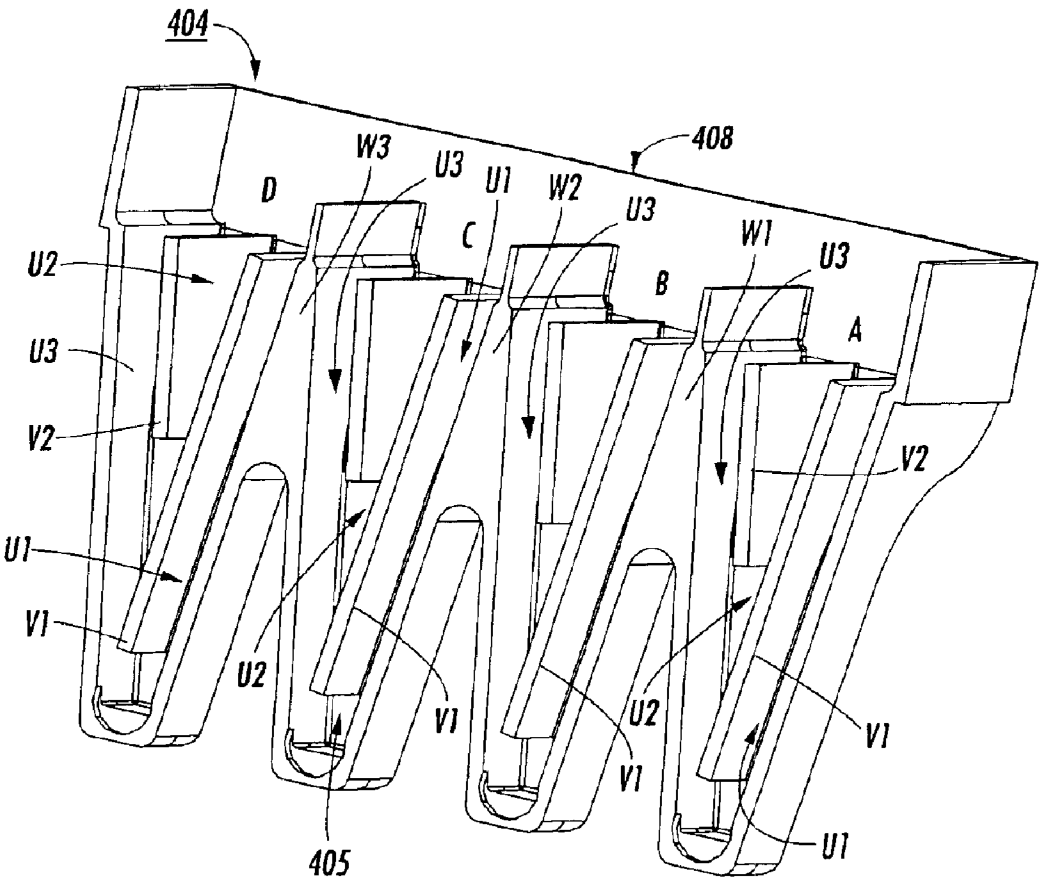
FIG. 4 is a schematic of the inside or back side of the housing of the low pressure reservoir of FIG. 3.

As shown in FIGS. 2 and 4, the LPR 404 has a first aluminum housing 408 that is connected to and below the melter assembly 300, and that includes four different segments 404A, 404B, 404C, 404D, (one segment for each color ink CYMK). The first aluminum housing 408 has segment walls W1, W2, W3 for separately storing ink of a particular color CYMK when closed off by a reservoir sealing plate 430, which serves as a back plate (FIG. 3) to the housing 408. Each segment 404A, 404B, 404C, 404D is further divided into a number of compartments U1, U2, U3 (for example, 3 are shown) by short walls V1, V2, for preventing formation of one massive block of molten liquid ink in each such segment in the case of heat failure and ink solidification therein. Additionally, the segment walls Wi, W2, W3 and short walls V1, V2 function to increase the surface area of the housing 408 that is in contact with ink within such housing. This is particularly helpful during cold starts and remelting of such ink. As further shown, the segment walls W1, W2, W3 and short walls V1, V2 form and define wedge shape compartments U1, U2 in each segment, each ending in a taper that is designed to prevent a heavier block of solid ink therein from sliding down and falling into liquid ink located all the way at the bottom of the segment. Such a fall would of course ordinarily and undesirably "pump" liquid ink therein into the high pressure reservoir during warm up.

As shown, the first aluminum housing 408 is open on the backside 405, and the back plate 430 is therefore provided for mounting to such backside to close and seal it off. The segment walls, e.g. U1, U2, U3 of each segment also effectively seal against the mounted back plate 430, and thus separately store different color molten liquid inks in the different segments without cross-contamination. The check valve device 500 is located at the bottom portion of the closed off first aluminum housing 408, for controlling flow of molten liquid ink from the LPR 404 through the back plate 430 to the second storage reservoir or high pressure (HPR) 414. The molten liquid ink thus is allowed to flow gravitationally downhill from the LPR 404 through the check valve device 500 into the HPR 414. This ordinarily enables and allows for FIFO control and usage of molten liquid ink coming from the melter assembly, and thus leaving no hidden or dead areas or spots in between to trap any of such ink.

Figure 5:
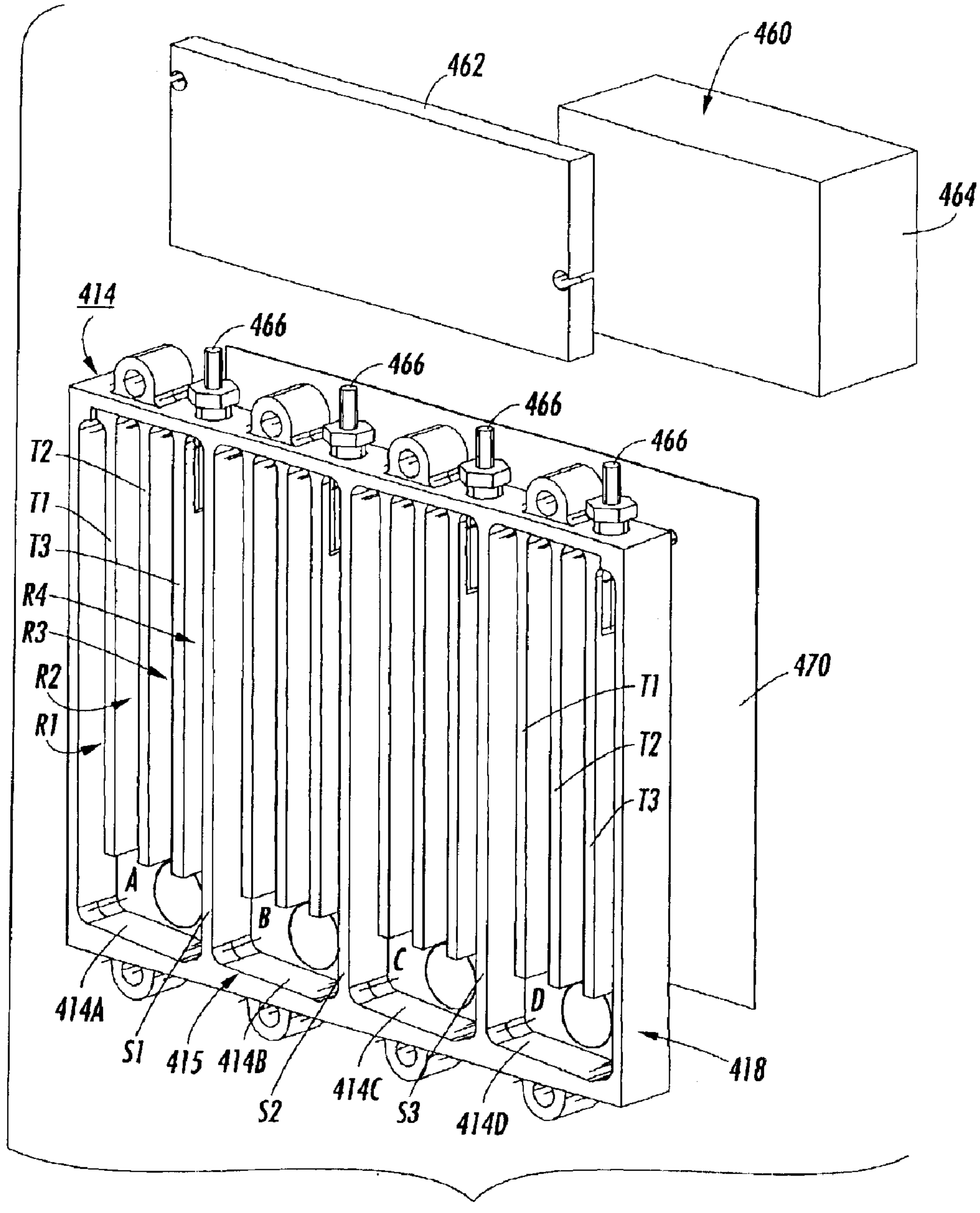
FIG. 5 is a schematic of the inside or front side of the housing of the high pressure reservoir of FIG. 3.

As shown in FIG. 5, the high pressure reservoir (HPR) 414 has a second aluminum housing 418 that similarly includes four different segments 414A, 414B, 414C, 414D, (one segment for each color ink CYMK). The second aluminum housing 418 has segment walls S1, S2, S3 for separately storing ink of a particular color CYMK when closed off by the plate 430 (FIG. 3). Each segment 414A, 414B, 414C, 414D is further divided into a number of compartments R1, R2, R3, R4 (for example, 4 are shown) by short walls T1, T2, T3 for preventing formation of one massive block of molten liquid ink in each such segment in the case of heat failure and ink solidification therein.

As further shown, the second aluminum housing 418 is open on the front side 415, and the plate 430 is therefore provided for mounting to such front side 415 to close and seal it off. The segment walls, e.g. S1, S2, S3 of each segment 414A, 414B, 414C, 414D also effectively seal against the mounted plate 430, and thus separately store different color molten liquid inks in the different segments without cross-contamination. At the bottom portion of the closed off second aluminum housing 418, discharge openings 419 (FIG. 3) in general with individual openings (419A not showing), 419B, 419C, 419D (one for each color ink CYMK) are provided for molten liquid ink flow into the filter assembly 420, and towards the printhead system 30.

Figure 6:
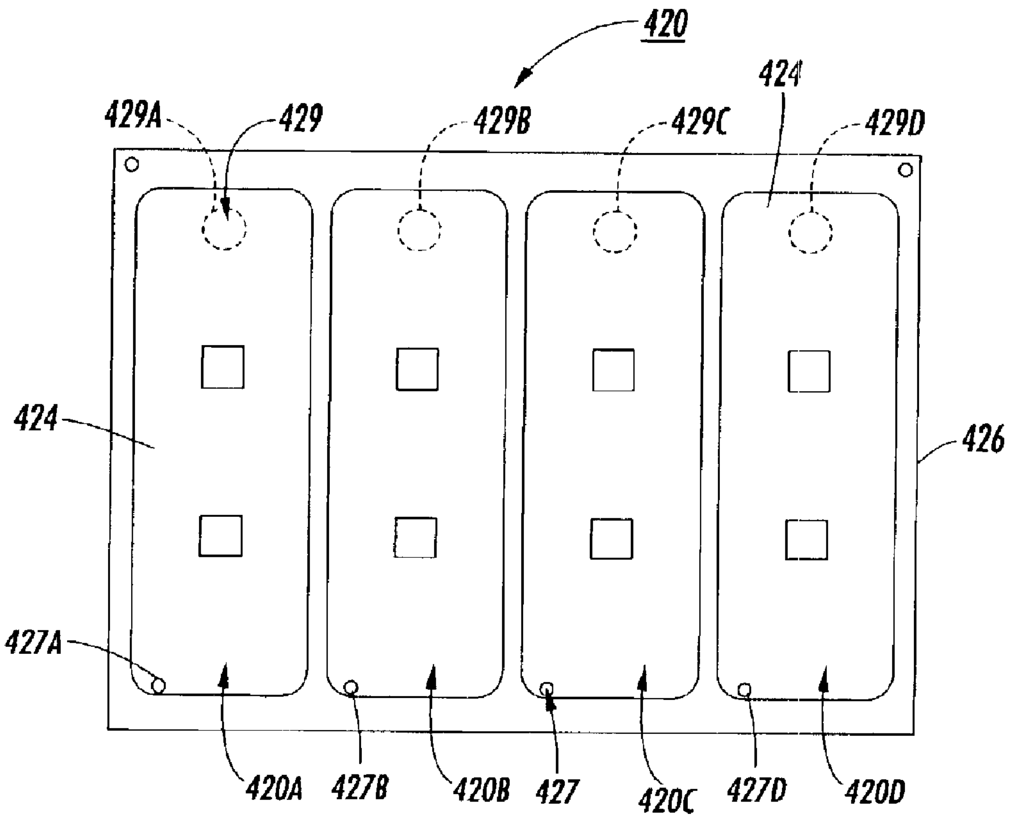
FIG. 6 is a schematic illustration of the filter element and back plate of the filter assembly of the phase change ink melting and control apparatus of the present invention.

Referring now to FIGS. 3 and 6, the filter assembly 420 comprises segments 420A, 420B, 420C, 420D, corresponding to the different color inks CYMK, as well as to segments 414 (A–D of the HPR 414). As further shown, filter assembly as a whole includes a front plate 422, a filter element 424 in each segment, and a back plate 426. Molten ink inlets 427 in general with individual inlets 427A, 427B, 427C, 427D (one for each color ink CYMK) are formed at the bottom portion of the first plate 422, and discharge openings 429 in general with individual discharge openings 429A, 429B, 429C, 429D (one for each color ink CYMK) are formed at the top portion of the back plate 426. The filter element 424 for example is comprised of a 10 micron Purolator mesh material for ensuring that the molten ink is clean before it is fed towards the printhead system 30.

As can be seen, there has been provided in a high-speed phase change ink image producing machine having a printhead system and a controller, apparatus and method for melting solid phase change ink into melted molten liquid ink, and for controlling the melted molten liquid ink to achieve a high throughput rate of image production are provided. The apparatus for the method includes (a) feeding assembly for first feeding solid pieces of phase change ink into a solid pieces melter housing; (b) a melter assembly including a melter housing and a melting device for heating and melting the solid pieces of phase change ink to form melted molten liquid ink; (c) a first storage and control apparatus including a first storage reservoir for storing and controlling a first quantity of the melted molten liquid ink in the first storage reservoir; (d) a second storage reservoir and filter assembly connected to the first storage reservoir for holding a second volume of the melted molten liquid ink; and (e) control apparatus for controlling flow of melted molten liquid ink from the first storage reservoir into the second storage reservoir and filter assembly, and from the second storage reservoir towards a printhead system.

While the embodiment of the present invention disclosed herein is preferred, it will be appreciated from this teaching that various alternative, modifications, variations or improvements therein may be made by those skilled in the art, which are intended to be encompassed by the following claims:

What is claimed is:

1. In a high-speed phase change ink image producing machine having a printhead system and a controller, a method of melting solid phase change ink into melted molten liquid ink, and controlling the melted molten liquid ink for a high throughput rate of image production, the method comprising:

(a) first feeding solid pieces of phase change ink into a solid pieces melter housing;

(b) heating and melting said solid pieces of phase change ink within said melting housing to form melted molten liquid ink;

(c) next feeding and controlling a first quantity of said melted molten liquid ink into a first storage reservoir;

(d) connecting to said first storage reservoir, a second storage reservoir for holding a second volume of said melted molten liquid ink; and (e) controlling flow of melted molten liquid ink from said first storage reservoir into said second storage reservoir and from said second storage reservoir towards a printhead system, said controlling of flow of melted molten liquid ink comprising allowing melted molten liquid ink to flow gravitationally through a check valve device from said first storage reservoir into said second storage reservoir.

2. The method of claim 1, wherein said first feeding of solid pieces of phase change ink comprises gravitationally dropping a controlled quantity of solid pieces of phase change ink into said melter housing.

3. The method of claim 1, wherein next feeding and controlling said first quantity of melted molten liquid ink into said first storage reservoir includes sensing a level of said first quantity of melted molten liquid ink in said first storage reservoir.

4. The method of claim 1, wherein controlling flow of melted molten liquid ink comprises allowing melted molten liquid ink to flow gravitationally through a check valve device from said first storage reservoir into said second storage reservoir, and pressurizing said second storage reservoir to force flow of melted molten liquid ink from said second storage reservoir towards said printhead system.

5. In a high-speed phase change ink image producing machine having a printhead system and a controller, apparatus for melting solid phase change ink into melted molten liquid ink, and for controlling the melted molten liquid ink to achieve a high throughput rate of image production, the apparatus for comprising:

(a) feeding assembly for first feeding solid pieces of phase change ink into a solid pieces melter housing;

(b) a melter assembly including a melter housing and a melting device for heating and melting said solid pieces of phase change ink to form melted molten liquid ink;

(c) first storage and control means including a first storage reservoir receiving ink from said melter assembly for storing and controlling a first quantity of said melted molten liquid ink in said first storage reservoir;

(d) a second storage reservoir and filter assembly connected to said first storage reservoir for holding a second volume of said melted molten liquid ink; and (e) control means for controlling flow of melted molten liquid ink from said first storage reservoir into said second storage reservoir and filter assembly, and from said second storage reservoir towards a printhead system, said control means including flow and control apparatus having a check valve device for gravitationally feeding melted molten liquid ink from said first storage reservoir into said second storage reservoir.

6. The apparatus of claim 5, wherein said feeding assembly includes feed tubes for gravitationally dropping a controlled quantity of solid pieces of phase change ink into said melter housing.

7. The apparatus of claim 5, wherein said first storage and control means includes a level sensor for sensing a level of said first quantity of melted molten liquid ink in said first storage reservoir.

8. The apparatus of claim 5, wherein said control means includes (a) flow and control apparatus having a check valve device for gravitationally feeding melted molten liquid ink from said first storage reservoir into said second storage reservoir, and (b) pressurization means for pressurizing said second storage reservoir to force flow of melted molten liquid ink from said second storage reservoir towards said printhead system.

9. The apparatus of claim 5, including a heating element mounted to said second storage reservoir for maintaining melted molten liquid ink associated therewith in melted molten liquid form.

10. The apparatus of claim 5, including a filter assembly mounted downstream of said first storage reservoir for filtering melted molten liquid ink being fed towards said printhead system.

11. A high-speed phase change ink image producing machine comprising:

(a) a control subsystem for controlling operation of all subsystems and components of the image producing machine;

(b) a movable imaging member having an imaging surface;

(c) a printhead system connected to said control subsystem for ejecting drops of melted molten liquid ink onto said imaging surface to form an image; and (d) apparatus for melting solid phase change ink into melted molten liquid ink, and for controlling the melted molten liquid ink, said apparatus including:

(i) feeding assembly for first feeding solid pieces of phase change ink into a solid pieces melter housing;

(ii) a melter assembly including a melter housing and a melting device for heating and melting said solid pieces of phase change ink to form melted molten liquid ink;

(iii) first storage and control means including a first storage reservoir receiving ink from said melter assembly for storing and controlling a first quantity of said melted molten liquid ink in said first storage reservoir;

(iv) a second storage reservoir and filter assembly connected to said first storage reservoir for holding a second volume of said melted molten liquid ink; and (v) control means for controlling flow of melted molten liquid ink from said first storage reservoir into said second storage reservoir and filter assembly, and from said second storage reservoir towards a printhead system, said control means including flow and control apparatus having a check valve device for gravitationally feeding melted molten liquid ink from said first storage reservoir into said second storage reservoir.

12. The machine of claim 11, wherein said feeding assembly includes feed tubes for gravitationally dropping a controlled quantity of solid pieces of phase change ink into said melter housing.

13. The machine of claim 11, wherein said first storage and control means includes a level sensor for sensing a level of said first quantity of melted molten liquid ink in said first storage reservoir.

14. The machine of claim 11, wherein said control means includes (a) flow control apparatus having a check valve device for gravitationally feeding melted molten liquid ink from said first storage reservoir into said second storage reservoir, and (b) pressurization means for pressurizing said second storage reservoir to force flow of melted molten liquid ink from said second storage reservoir towards said printhead system.

15. The apparatus of claim 11, including a heating element mounted to said second storage reservoir for maintaining melted molten liquid ink associated therewith in melted molten liquid form.

16. The machine of claim 11, including a filter assembly mounted downstream of said first storage reservoir for filtering melted molten liquid ink being fed from said second reservoir towards said printhead system.

17. The machine of claim 11, wherein said first storage reservoir includes a first aluminum housing having plural segments for separately containing different colors of the melted molten liquid ink.

18. The machine of claim 11, wherein said second storage reservoir includes a second aluminum housing having plural segments for separately containing different colors of the melted molten liquid ink.

19. The machine of claim 17, wherein each segment of said plural segments of said first aluminum housing includes short walls dividing said each segment into plural compartments for preventing formation of one massive block of molten liquid ink in each such segment in the case of heat failure and ink solidification therein.

20. The machine of claim 18, wherein each segment of said plural segments of said second aluminum housing includes short walls dividing said each segment into plural compartments for preventing formation of one massive block of molten liquid ink in each such segment in the case of heat failure and ink solidification therein.

* * * * *